United States Patent
Jiang et al.

(10) Patent No.: US 11,039,452 B2
(45) Date of Patent: Jun. 15, 2021

(54) LTE-U AND WIFI 5G CHANNEL SELF-INTERFERENCE ADDRESSING METHOD AND SYSTEM

(71) Applicant: JRD Communication (Shenzhen) LTD., Shenzhen (CN)

(72) Inventors: Xian Jiang, Shenzhen (CN); Xianghui Lou, Shenzhen (CN); Longjie Yu, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 73 days.

(21) Appl. No.: 16/490,073

(22) PCT Filed: Feb. 9, 2018

(86) PCT No.: PCT/CN2018/075942
§ 371 (c)(1),
(2) Date: Aug. 30, 2019

(87) PCT Pub. No.: WO2018/157722
PCT Pub. Date: Sep. 7, 2018

(65) Prior Publication Data
US 2020/0077409 A1 Mar. 5, 2020

(30) Foreign Application Priority Data
Mar. 1, 2017 (CN) .......................... 201710118014.7

(51) Int. Cl.
*H04W 72/08* (2009.01)
*H04W 76/27* (2018.01)
(Continued)

(52) U.S. Cl.
CPC ........... *H04W 72/082* (2013.01); *H04W 8/00* (2013.01); *H04W 12/00* (2013.01); *H04W 16/06* (2013.01);
(Continued)

(58) Field of Classification Search
CPC ........... H04W 72/082; H04W 72/1215; H04W 16/06; H04W 16/14; H04W 88/10; H04W 74/0816; H04W 76/27
See application file for complete search history.

(56) References Cited

U.S. PATENT DOCUMENTS 10,342,029 B2 * 7/2019 Li ..................... H04W 72/1215
2016/0073366 A1 3/2016 Ng et al.
2016/0219588 A1 * 7/2016 Buddhikot .......... H04L 41/0896

FOREIGN PATENT DOCUMENTS

| CN | 105472622 | 4/2016 |
| CN | 106332094 | 1/2017 |
| WO | WO 2018/157722 | 9/2018 |

OTHER PUBLICATIONS

International Search Report and the Written Opinion dated Mar. 28, 2018 From the International Searching Authority Re. Application No. PCT/CN2018/075942 and Its Translation of Search Report Into English. (8 Pages).

* cited by examiner

*Primary Examiner* — Jamal Javaid

(57) ABSTRACT

Disclosed in the present invention are a LTE-U and WIFI 5G channel self-interference addressing method and system. An status change message of the LTE-U is received by a radio resource control layer of an LTE protocol stack, and reported to a mobile terminal application layer by a registration module of an non-access layer; and corresponding system parameters are configured according to the status change message of the LTE-U, and a WIFI available channel list is configured by using the system parameters to control the on and off of the 5 GHz channel. Therefore, a user can enjoy a high rate brought by the LTE-U network, and the WIFI hotspot and P2P of the user are ensured to be available externally, thus creating great convenience.

15 Claims, 8 Drawing Sheets

--- receiving an status change message of a LTE-U by a radio resource control layer of an LTE protocol stack, and reporting the same to a mobile terminal application layer by a registration module of an non-access layer — S100 configuring corresponding system parameters according to the status change message of the LTE-U, and configuring a WIFI available channel list by using the system parameters to control on and off of 5GHz channel — S200

(51) Int. Cl.
*H04W 16/06* (2009.01)
*H04W 16/14* (2009.01)
*H04W 72/12* (2009.01)
*H04W 74/08* (2009.01)
*H04W 88/10* (2009.01)
*H04W 12/00* (2021.01)
*H04W 8/00* (2009.01)

(52) U.S. Cl.
CPC ....... *H04W 16/14* (2013.01); *H04W 72/1215* (2013.01); *H04W 74/0816* (2013.01); *H04W 76/27* (2018.02); *H04W 88/10* (2013.01)

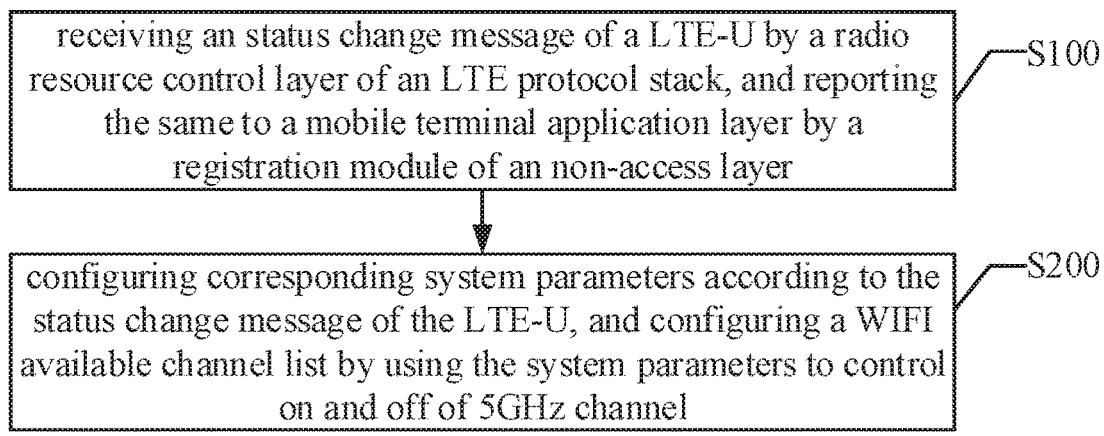
FIG. 3
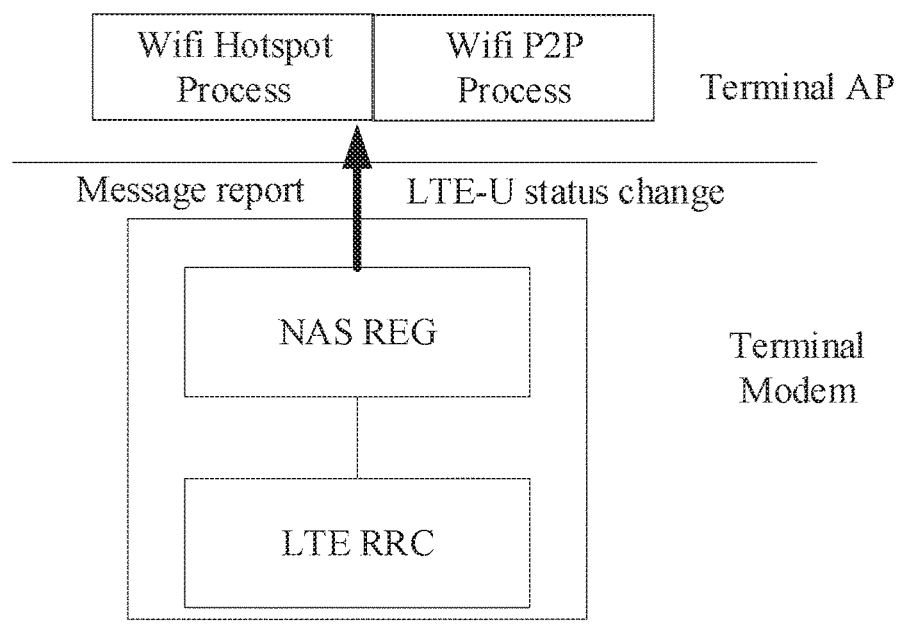
FIG. 4
FIG. 5

LTE-U AND WIFI 5G CHANNEL SELF-INTERFERENCE ADDRESSING METHOD AND SYSTEM

RELATED APPLICATIONS

This application is a National Phase of PCT Patent Application No. PCT/CN2018/075942 having International filing date of Feb. 9, 2018, which claims the benefit of priority of Chinese Patent Application No. 201710118014.7 filed on Mar. 1, 2017. The contents of the above applications are all incorporated by reference as if fully set forth herein in their entirety.

FIELD AND BACKGROUND OF THE INVENTION

The present invention relates to a field of LTE-U technologies, and more particularly to a LTE-U and WIFI 5G channel coexistence self-interference addressing method of a mobile terminal and a system.

With the rapid increase in the number of wireless mobile users and various internet accesses, the contradiction between infinitely increasing wireless demand and limited licensed spectrum resources has become increasingly prominent. In order to alleviate the network pressure of telecommunication operators, it is a new attempt to introduce a relatively rich resource-free licensed band into the LTE network. LTE-Unlicensed (LTE-U) uses unlicensed spectrum to increase available network traffic for cellular data communications. At present, various telecommunication operators and equipment vendors are strongly promoting the deployment of LTE-U solutions in the WIFI 5 GHz frequency band. However, for the coexistence of LTE-U and WIFI in unlicensed frequency bands, the industry is still constantly exploring improvements and scenario testing.

The traditional LTE is applied to the licensed frequency band and possesses absolute use rights to the working frequency band. Deploying 5 GHz usage of LTE-U in the mature LTE network means that the downlink unlicensed public frequency band channel will be exclusively occupied. Therefore, there is widespread controversy in the industry for the coexistence of LTE-U and WIFI 5 GHz channels on unlicensed bands. From the perspective of the role of the WIFI terminal, the interference can be divided into following two interferences.

One is external interference, and the terminal acts as a WIFI STA. The quality of WIFI is faced with external interference problems. The WIFI channel access protocol adopts the competition mode, carrier-aware multiple access and collision avoidance channel access (CSMA/CA), and the network node (Access Point or terminal) must listen to whether the channel is idle, and then decide whether to occupy and transmit the signal LBT (Listen Before Talk) before using a certain channel for transmission; if the channel is occupied, the corresponding program starts after delaying a random period of time to avoid the conflict. When the LTE-U occupies a 5 GHz unlicensed band channel, the WIFI STA may be in a listening status for a long time, and eventually the WIFI access of the terminal user fails. Therefore, the 3GPP organization proposed the LBT support for LTE-U in the LTE R13 standard, i.e. LAA (License Assisted Access); Qualcomm proposed the use of Carrier Sense Adaptive Transmission (CSAT) technology, which enables more efficient allocation of frequency usage in the presence of multiple users coexisting in the network.

The other is self-interference. The terminal is employed as the WIFI AP/P2P, when the WIFI signal transmitter works at 5 GHz, the LTE-U receiving antenna will receive a large co-channel interference, which is called self-interference. From the results of the laboratory OOBE test data, when the two work at the same frequency, the LTE-U receiving signal will be affected about 10 dBm. If the center frequencies of the two overlap, the LTE-U receiving signal has a greater impact. Then, it will directly reflect that the rate at which the terminal accesses the network is greatly reduced; the quality of the provided WIFI AP/P2P (depending on the operator's data capability) will also be reduced, resulting in significant inconvenience.

Therefore, the prior art has yet to be improved.

SUMMARY OF THE INVENTION

An objective of the present invention is to provide a LTE-U and WIFI 5G channel self-interference addressing method of a mobile terminal and a system, which aim to solve the problem that the LTE-U receiving antenna will receive large co-channel interference when the WIFI signal transmitter works at 5 GHz in the mobile terminal of the prior art.

In order to achieve the above objective, the present invention provides following technical solutions:

a storage medium, in which program data is stored in the storage medium, wherein the program data is executable to perform following operations:

receiving an status change message of a LTE-U by a radio resource control layer of an LTE protocol stack, and reporting the same to a mobile terminal application layer by a registration module of an non-access layer;

configuring corresponding system parameters according to the status change message of the LTE-U, and configuring a WIFI available channel list by using the system parameters to control on and off of 5 GHz channel;

wherein system parameters are global variables.

A LTE-U and WIFI 5G channel self-interference addressing system of a mobile terminal, including a memory and a processor, wherein the memory and the processor are coupled to each other:

the memory is configured to store operation instructions and an operation system executed by the processor;

the processor is configured to perform following operations according to the operation instructions: receiving an status change message of a LTE-U by a radio resource control layer of an LTE protocol stack, and reporting the same to a mobile terminal application layer by a registration module of an non-access layer;

configuring corresponding system parameters according to the status change message of the LTE-U, and configuring a WIFI available channel list by using the system parameters to control on and off of 5 GHz channel.

A LTE-U and WIFI 5G channel self-interference addressing method of a mobile terminal, including:

A, receiving an status change message of a LTE-U by a radio resource control layer of an LTE protocol stack, and reporting the same to a mobile terminal application layer by a registration module of an non-access layer;

B, configuring corresponding system parameters according to the status change message of the LTE-U, and configuring a WIFI available channel list by using the system parameters to control on and off of 5 GHz channel.

Compared to the prior art, in the LTE-U and WIFI 5G channel coexistence self-interference addressing method of a mobile terminal and the system according to the present invention, the 5 GHz channel usage time is staggered on the mobile terminal, which avoids the problem that the LTE-U receiving antenna will receive large co-channel interference when the WIFI signal transmitter works at 5 GHz. Therefore, a user can enjoy a high rate brought by the LTE-U network, and the WIFI hotspot and P2P of the user are ensured to be available externally, thus creating great convenience.

BRIEF DESCRIPTION OF THE SEVERAL VIEWS OF THE DRAWINGS

FIG. 3 is a flowchart diagram of a LTE-U and WIFI 5G channel self-interference addressing method of a mobile terminal according to the present invention.

FIG. 4 is a schematic diagram of a software architecture of a LTE-U and WIFI 5G channel self-interference addressing method of a mobile terminal according to the present invention.

FIG. 5 is a schematic content structure diagram of a status change message according to the present invention.

DESCRIPTION OF SPECIFIC EMBODIMENTS OF THE INVENTION

The present invention provides a LTE-U and WIFI 5G channel coexistence self-interference addressing method of a mobile terminal and a system. For the purpose, technical solutions and advantages of the present invention will become clear, unambiguous, embodiments of the present invention is described in further detail below with reference to the accompanying drawings simultaneously. It should be understood that the specific embodiments described herein are merely for explaining the present invention and are not intended to limit the present invention.

Figure 1:
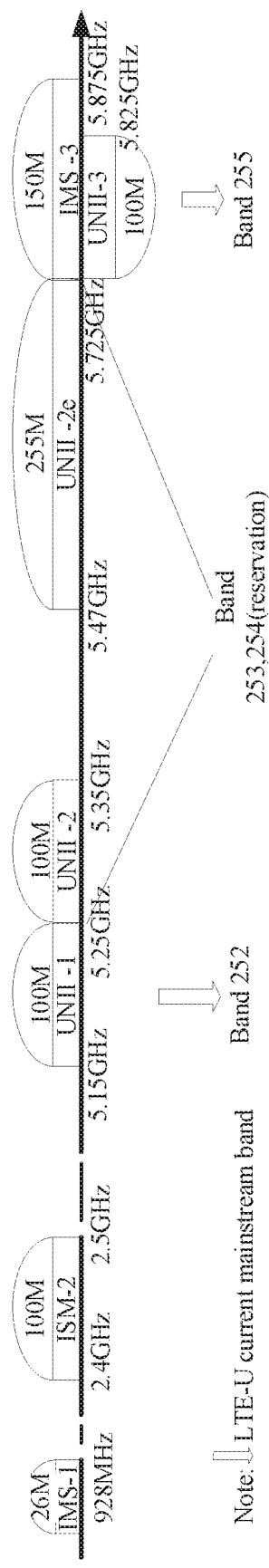
FIG. 1 is a schematic diagram of a mainstream LTE-U frequency band distribution in the prior art.

First, the self-interference described in the present invention will be described in detail below. LTE-U is to utilize unlicensed public frequency bands to compensate for the lack of bandwidth of the currently licensed band. Under the current frequency usage division system, the unlicensed bands are mainly used by WIFI and Bluetooth, including the 2.4 GHz band and the 5 GHz band. Since the WIFI with the largest number of users has gathered a large number of devices in the 2.4 GHz band, the channel is crowded. Therefore, the application research of LTE-U is currently concentrated on the 5 GHz band. As shown in FIG. 1, relying on the WIFI band division, the current LTE-U mainstream uses the 5 GHz band; The 5 GHz band is divided into three segments of UNII (Unlicensed National Information Infrastructure).

The range of LTE-U frequency bands currently defined in the existing LTE-U forum standard is shown in Table 1, and Table 1 is the frequency band range of LTE-U.

TABLE 1

| Band Number | downlink frequency band (MHz) | downlink minimum frequency | downlink frequency range |
|---|---|---|---|
| 252 | 5150 | 255144 | 255144-256143 |
| 255 | 5725 | 260894 | 260894-262143 |

Figure 2:
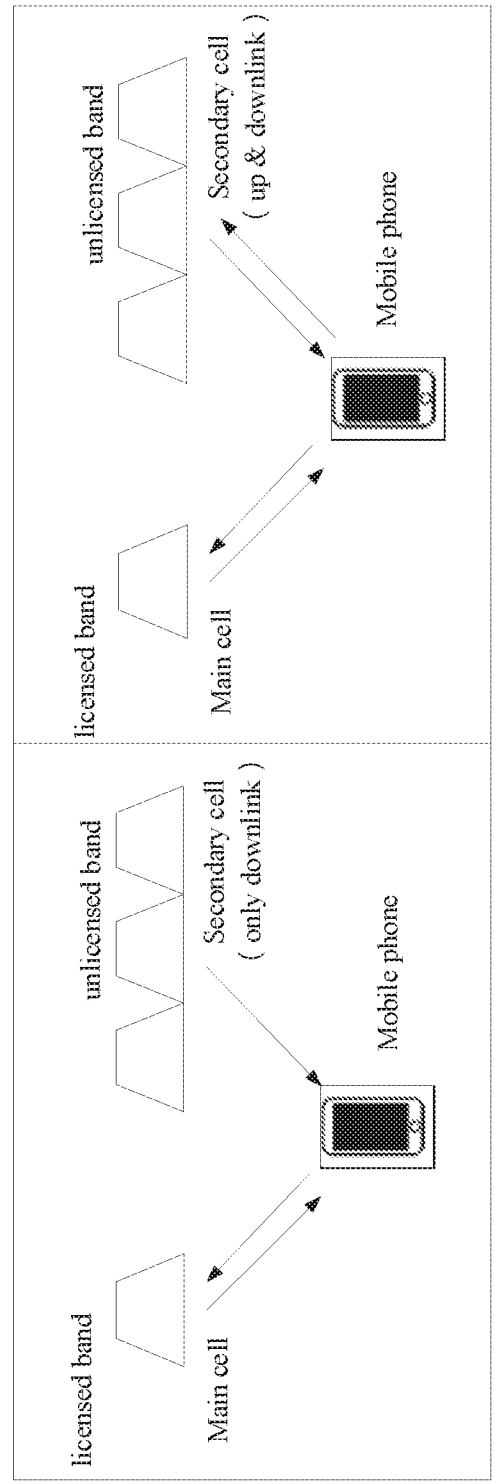
FIG. 2 is a schematic diagram of access modes of two LTE-Us in the prior art.

Based on the traditional LTE network, there are two types of LTE-U wireless network access modes, one is the downlink enhancement mode (SDL) as shown in the left side of FIG. 2, and the other is the carrier aggregation mode (CA) as shown on the right side of FIG. 2. FIG. 2 shows a mobile terminal, such as a mobile phone or tablet.

At present, many companies and research institutions have proposed to 3rd Generation Partnership Project (3GPP) to deploy LTE technology in the unlicensed band, i.e. LTE-U, to accelerate the transmission of public service areas of LTE. The telecommunication operator Verizon in the United States has tested LTE-U technology and has deployed LTE-U technology in the 5 GHz band since 2016. Meanwhile, the company T-Mobile in USA has deployed its technology called "Licensed Assistance Access" (LAA, a form of LTE-U) in the 5 GHz band in 2016. LTE-U is a good solution to the strain on the spectrum resources of operators and can provide users with a better data experience. The business value brought by thereby is limitless. At the same time, LTE-U, as the fifth-generation mobile communication system (5G) enhancement technology, has attracted widespread attention from mobile communication researchers around the world.

At present, most intelligent terminals are equipped with WIFI chips, which can not only use the surrounding wireless internet but also serve as wireless access points, which mainly are WIFI Hotspot and WIFI P2P (Point 2 Point) applications. WIFI hotspot refers to converting the received GPRS, 3G or 4G signals of the terminal into WIFI signals and then sending them out, so that the terminal becomes an access point (AP) and provides the WIFI STA (Station) network traffic transmission service; WIFI P2P, also known as WIFI Direct, refers to a local area network that allows wireless devices to communicate directly in a point-to-point manner, forming a Group Owner and Group Client mode. Both of these are fast and simple WIFI applications that are frequently used by users. Both WIFI Hotspot and P2P can be used on 5 GHz channel and 2.4 GHz channel but usually the software default is to use the 5 GHz band, and the 2.4 GHz band will be the second choice only after trying to access the channel fails. Besides, WIFI Hotspot provides a menu of channel selection lists on the human machine interface, allowing users to control the usage of channels, such as 2.4 GHz+5 GHz, 5 GHz only and 2.4 GHz only.

The current mainstream mobile intelligent terminals can provide users with various wireless communication services provided by the operators, and have a good user experience in the human machine interface. Therefore, most of the terminals use BP (Baseband Processor) and AP (Application Processor) cooperative communication mechanisms in the software structure. The main role of BP is to send and receive data for various terminals to communicate with the wireless network; AP is running an operating system and application software, such as Android and Windows. Generally, the two messages are transmitted and interacted by the TLV (Type Length Value, message type, length, content) format. This communication mechanism of the terminal provides developers with an extensible platform.

In case that the terminal is employed as the WIFI AP/P2P, when the WIFI signal transmitter works at 5 GHz, the LTE-U receiving antenna will receive a large co-channel interference, which is called self-interference. From the results of the laboratory OOBE test data, when the two work at the same frequency, the LTE-U receiving signal will be affected about 10 dBm. If the center frequencies of the two overlap, the LTE-U receiving signal has a greater impact. Then, it will directly reflect that the rate at which the terminal accesses the network is greatly reduced; the quality of the provided WIFI AP/P2P (depending on the operator's data capability) will also be reduced. The technical solution proposed by the present invention is to solve the problem of self-interference.

Please refer to FIG. 3. The present invention provides a LTE-U and WIFI 5G channel self-interference addressing method of a mobile terminal. The self-interference addressing method includes:

S100, receiving an status change message of a LTE-U by a radio resource control layer of an LTE protocol stack, and reporting the same to a mobile terminal application layer by a registration module of an non-access layer;

S200, configuring corresponding system parameters according to the status change message of the LTE-U, and configuring a WIFI available channel list by using the system parameters to control on and off of 5 GHz channel.

The foregoing steps are described in detail below in conjunction with specific embodiments.

As shown in FIG. 4, FIG. 4 is a schematic diagram of a software architecture of a LTE-U and WIFI 5G channel self-interference addressing method of a mobile terminal according to the present invention. Specifically, the principle of the present invention is that the terminal receives the LTE-U status change message on the RRC (Radio Resource Control) layer of the Modem side LTE protocol stack, and reports the message to the terminal AP (specifically, the mobile terminal application layer) through the REG (Registration Module) layer of the NAS (non-access stratum). After receiving the status change message, the AP side configures corresponding system parameter values according to the c status change message. Since the system parameters are global variables, both the WIFI Hotspot processing module and the P2P processing module can be accessed. Accordingly, the system parameters can be used to control the WIFI available channel list, i.e. 2.4 GHz only, or 2.4 GHz+5 GHz.

The invention correspondingly controls the activation (on) of the WIFI 5 GHz channel according to the status change of the LTE-U. The WIFI 5 GHz channel is turned off when LTE-U is activated, and the WIFI 5 GHz channel is turned on when LTE-U is deactivated. Thus, the 5 GHz channel usage time is staggered on the mobile terminal, which avoids the problem that the LTE-U receiving antenna will receive large co-channel interference when the WIFI signal transmitter works at 5 GHz. Therefore, a user can enjoy a high rate brought by the LTE-U network, and the WIFI hotspot and P2P of the user are ensured to be available externally, thus creating great convenience.

Preferably, the status change message includes: a cell status, a cell identification number, a cell frequency point and a cell data bandwidth of the LTE-U as a secondary cell; wherein the cell status includes an activated state and a deactivated state; the system parameters include: a first system parameter for initiating a WIFI hotspot channel check and a second system parameter for initiating a WIFI P2P channel check. Please refer to FIG. 5. FIG. 5 is a schematic content structure diagram of a status change message according to the present invention. As shown in figure, the present invention is in accordance with the TLV format common to the message format, and Type is Service_NAS, and Value (content) part is designed as shown in FIG. 5. The cell_state is the cell state (including the activation state and the deactivation state), and the cell_id is the cell identification number, and the freq is the cell frequency point, and the bandwidth is the cell data bandwidth, and the message is reported to the AP side (that is, the application layer of the mobile terminal) at the upper layer of the terminal by using the supported BP communication mechanism and AP communication mechanism. After receiving the status change message, the AP side configures the corresponding system parameter values according to the cell_state, wherein the value change of the first system parameter, persist.radio.wifi.hotspot.lteu initiates the WIFI hotspot channel check, while the second system parameter, persist.radio.wifi.p2p.lteu initiates the WIFI P2P channel check.

In practical applications, the cell status of LTE-U cell includes an activated state and a deactivated state.

Preferably, when the mobile terminal enters the LTE-U activation state, Step S100 specifically includes:

S111, carrying LTE-U configuration information by an added list of the secondary cell in a RRC connection reconfiguration process of an air interface message, and using the LTE-U as the secondary cell after being confirmed by the mobile terminal when the mobile terminal enters a LTE-U activation state;

S112, transmitting the status change message of the secondary cell to a mobile terminal application layer with a mobile terminal modem by using a BP communication mechanism and an AP communication mechanism of the mobile terminal.

Figure 6:
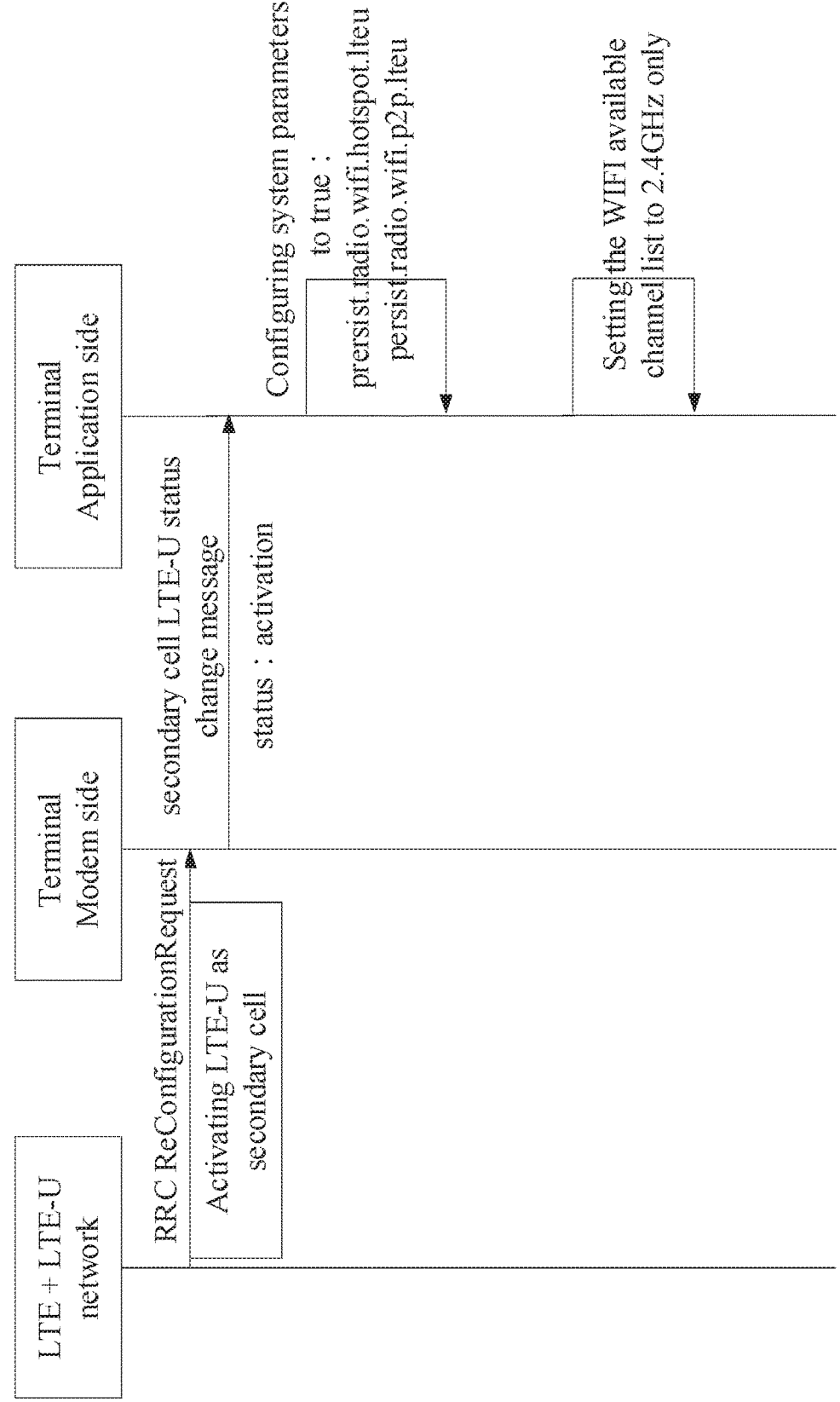
FIG. 6 is a flowchart of implementing a LTE-U and WIFI 5G channel self-interference addressing method of a mobile terminal to enter an activation state according to the present invention.

Specifically, referring to FIG. 6, FIG. 6 is a flowchart of implementing a LTE-U and WIFI 5G channel self-interference addressing method of a mobile terminal to enter an activation state according to the present invention. FIG. 6 shows the control of the WIFI available channel list by the software as the terminal enters the LTE-U activation state. First, the network side carries the LTE-U configuration information through the sCellToAddModList (addition list of the secondary cell) in the RRC Connection Reconfiguration process of the air interface message, and after the confirmation of the terminal, the LTE-U is used as a secondary cell; the mobile terminal modem transmits the status change message of the secondary cell to the mobile terminal application layer by using a BP communication mechanism and an AP communication mechanism of the mobile terminal. At this point, the cell_state field value in the message is Active.

Preferably, Step S200 includes:

S211, receiving the status change message by the mobile terminal application layer to set a parameter value of the first system parameter and a parameter value of the second system parameter to true, and starting a WIFI channel usage check process to set a WIFI available channel list to 2.4 GHz and to control the 5 GHz channel to be off.

Specifically, after Step S112, then, as receiving the status change message, Application will first set the two system parameter values (i.e. persist.radio.wifi.hotspot.lteu and persist.radio.wifi.p2p.lteu in FIG. 6.) from the default false to true, and broadcast the system value change to start the WIFI channel usage check process, and then the WIFI available channel list is set to 2.4 GHz. The value change of the first system parameter, persist.radio.wifi.hotspot.lteu initiates the WIFI hotspot channel check, while the second system parameter, persist.radio.wifi.p2p.lteu initiates the WIFI P2P channel check.

Figure 7:
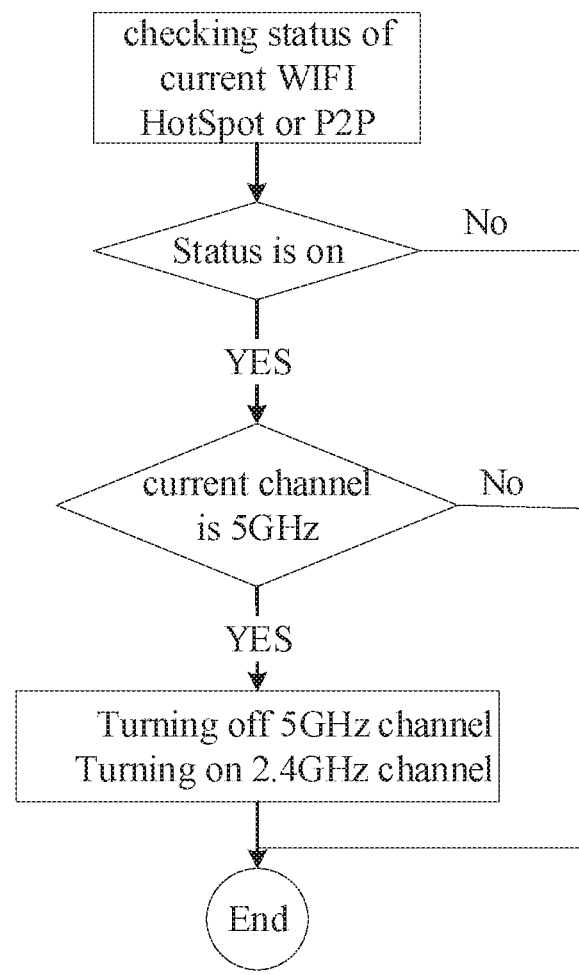
FIG. 7 is a schematic diagram of a WIFI channel usage check process according to the present invention.

Preferably, referring to FIG. 7, FIG. 7 is a schematic diagram of a WIFI channel usage check process according to the present invention. The WIFI channel check process according to the present invention includes the query of the WIFI hotspot or the query of the WIFI P2P, and the processes are the same. As shown in FIG. 7, first, checking the status of the current WIFI HotSpot or P2P, and if it is on, continuing to determine whether the current channel is 5 GHz or not; if it is not, ending the process; if the current channel is 5 GHz, turning off the 5 GHz channel and starting the 2.4 GHz channel; if the current channel is not 5 GHz, ending the process.

Preferably, when the mobile terminal enters the LTE-U deactivation state, Step S100 specifically includes:

S121, notifying the mobile terminal modem by the RRC connection reconfiguration process of the air interface message, and deactivating a current LTE-U as the secondary cell when the mobile terminal enters a LTE-U deactivation state;

S122, transmitting the status change message of the secondary cell to a mobile terminal application layer with a mobile terminal modem by using a BP communication mechanism and an AP communication mechanism of the mobile terminal.

Preferably, Step S200 includes:

S221, receiving the status change message by the mobile terminal application layer to set a parameter value of the first system parameter and a parameter value of the second system parameter to false, and setting a WIFI available channel list to 2.4 GHz and 5 GHz to control the 5 GHz channel to be on.

Figure 8:
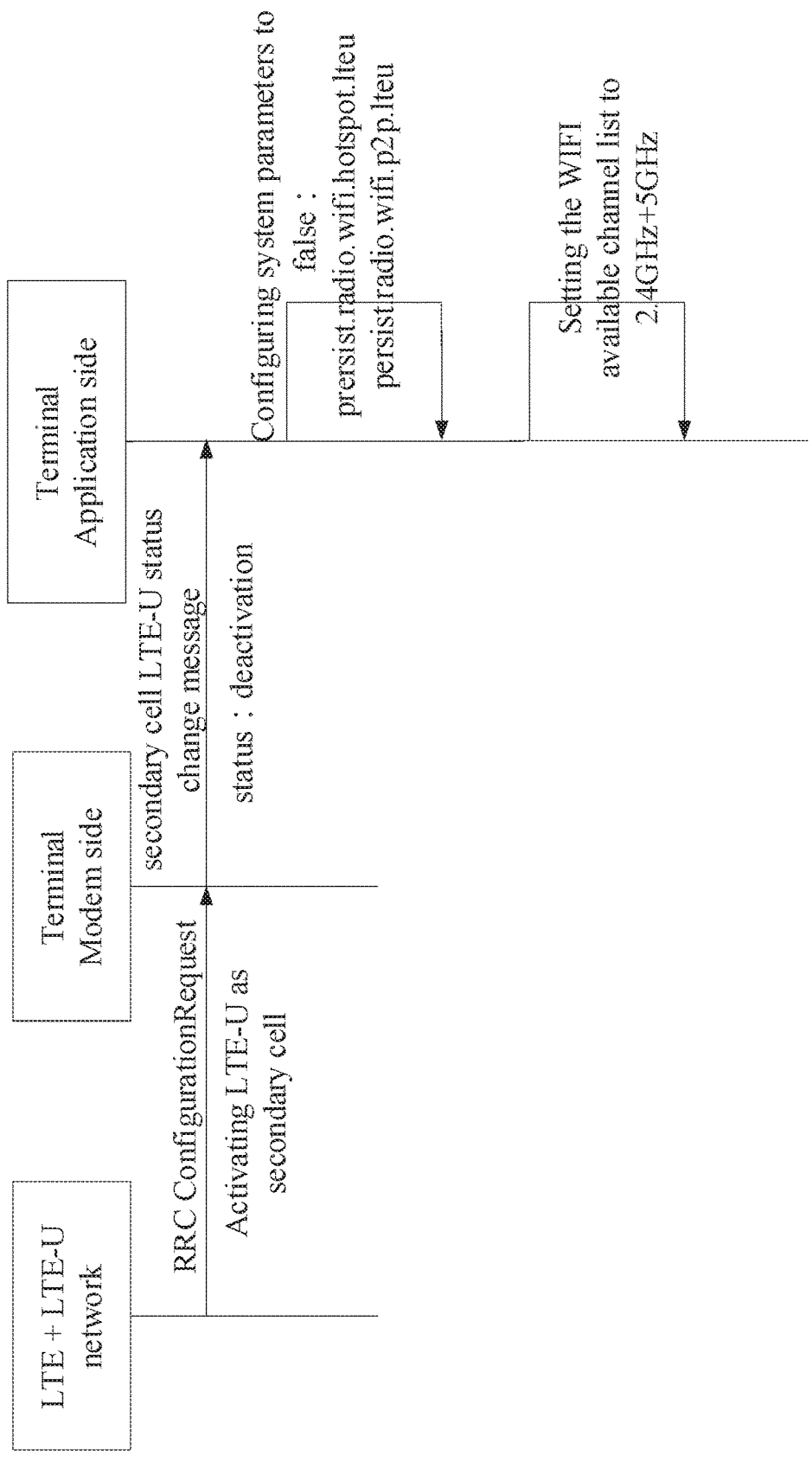
FIG. 8 is a flowchart of implementing a LTE-U and WIFI 5G channel self-interference addressing method of a mobile terminal to enter a deactivation state according to the present invention.

Specifically, referring to FIG. 8, FIG. 8 is a flowchart of implementing a LTE-U and WIFI 5G channel self-interference addressing method of a mobile terminal to enter a deactivation state according to the present invention. FIG. 8 is an implementation flow of entering LTE-U deactivation, and the terminal software controls the available channel of the WIFI. Similarly, the network side notifies Modem to activate the current LTE-U secondary cell through the RRC Connection Reconfiguration process of the air interface message; Application receives the status change message from the Modem side, wherein the cell_state field value is false, and the Application layer first sets the two system parameter values to false. Finally, the WIFI available channel list is set to 2.4 GHz+5 GHz.

In actual application, the currently activated AP/P2P service still maintains the previous channel usage. However, for the WIFI Hotspot service, the user can choose his own specific channel 5 GHz or 2.4 GHz again; for the WIFI P2P service, the subsequent reuse (enable to turn off and on) will follow the default design, preferring the 5 GHz channel. Besides, when the mobile terminal is camped on the non-LTE-U common network, there is no the LTE-U status message carrying the sCellToAddModList to be reported through RRC Connection Reconfiguration. In this case, the WIFI hotspot or P2P is turned on, and the application parameter value read by the Application layer is false. The Hotspot allows the user to select the channel, and the P2P default design preferably selects 5 GHz. This is the same as the default behavior of the terminal, so it is not shown in the figure.

Figure 9:
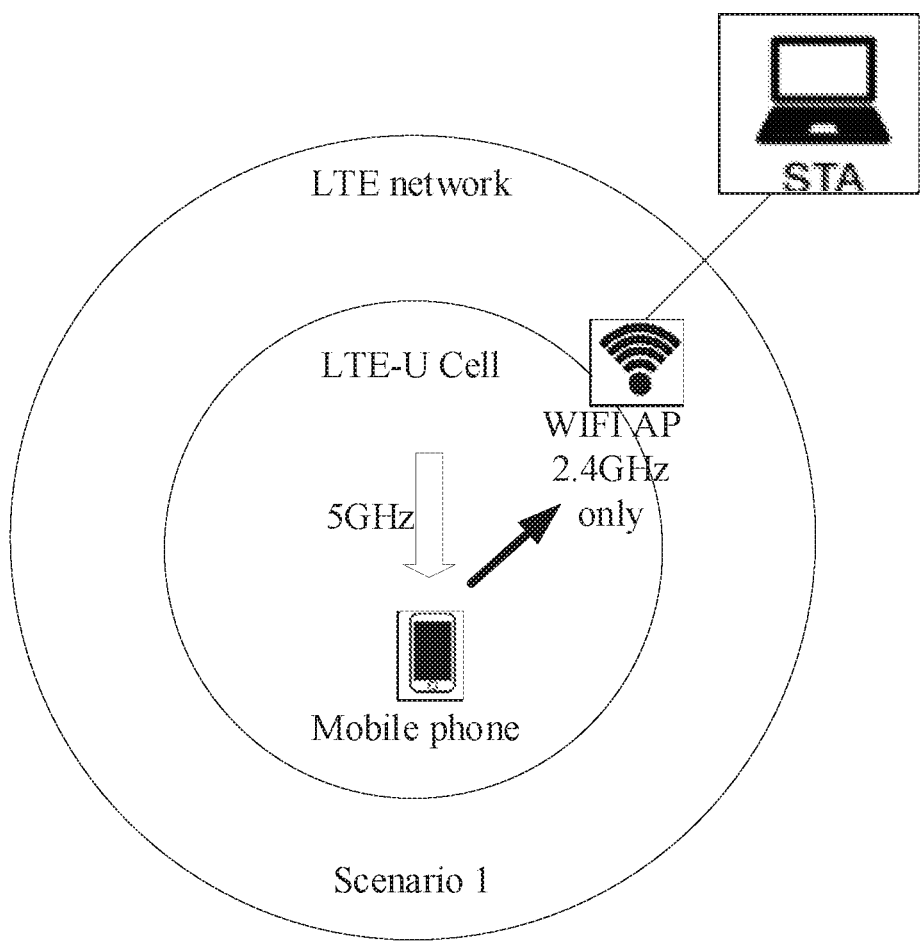
FIG. 9 is a schematic diagram of a first application embodiment of a LTE-U and WIFI 5G channel self-interference addressing method of a mobile terminal according to the present invention.

Please refer to FIG. 9. FIG. 9 is a schematic diagram of a first application embodiment of a LTE-U and WIFI 5G channel self-interference addressing method of a mobile terminal according to the present invention. The LTE-U and WIFI 5G channel self-interference addressing method of the mobile terminal according to the present invention applied to the real user environment and the network mainly has two scenarios, and one thereof is shown in FIG. 9. The LTE network is an LTE network coverage (LTE cell), and the LTE-U CELL is an LTE-U coverage (LTE-U cell), and a mobile terminal, such as a mobile phone, is shown in the LTE-U coverage in FIG. 9. In scenario 1, the mobile phone is within the coverage of the LTE network and the coverage of the LTE-U cell. Then, after rebooting to register the LTE to the network, the LTE-U of the downlink carrier is successfully activated as the secondary cell through the RRC reconfiguration message of air interface. In this case, when the terminal is enabled with the WIFI hotspot function or the WIFI P2P function, the available channel is only 2.4 GHz, and the working channel is at 2.4 GHz, and the WIFI AP/P2P service is provided externally, as shown in application scenario 1 of FIG. 9; if the user has previously turned on the WIFI AP/P2P service to work on the 5 GHz channel, it will be forced to switch to 2.4 GHz due to the WIFI channel usage check process.

Figure 10:
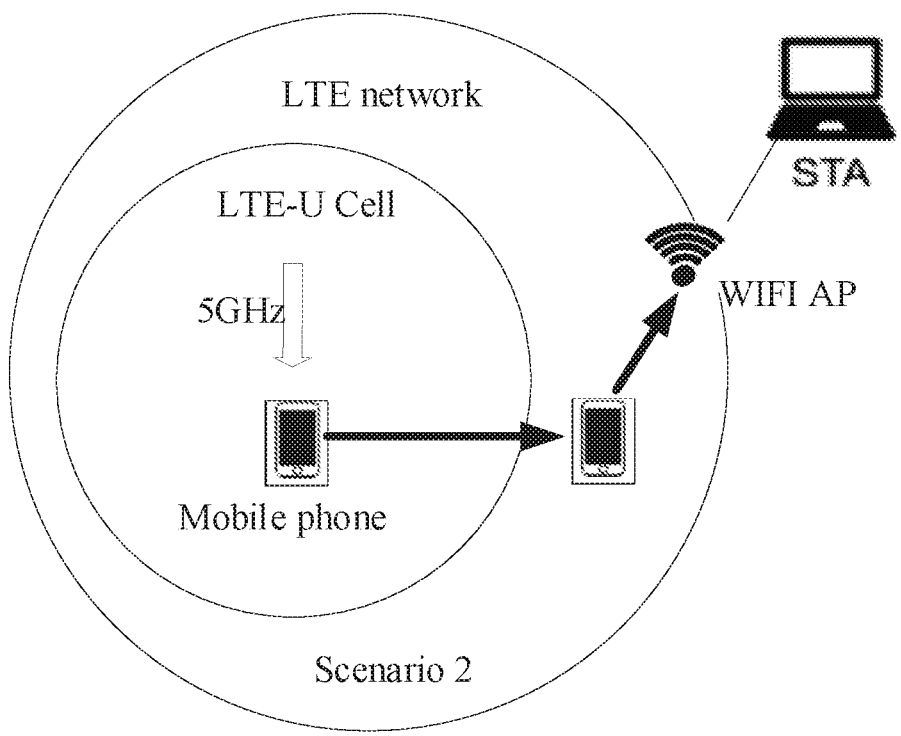
FIG. 10 is a schematic diagram of a second application embodiment of a LTE-U and WIFI 5G channel self-interference addressing method of a mobile terminal according to the present invention.

Please refer to FIG. 10. FIG. 10 is a schematic diagram of a second application embodiment of a LTE-U and WIFI 5G channel self-interference addressing method of a mobile terminal according to the present invention. In such scenario 2, the location of the mobile phone leaves the LTE-U coverage, which can cause a status change. In scenario 2, the mobile phone resides in the same LTE cell but moves and leaves the coverage of the LTE-U network, and the RRC reconfiguration message of the air interface will deactivate the LTE-U secondary cell. In this case, the mobile phone will maintain the original WIFI AP/P2P operating frequency but add 2.4 GHz+5 GHz to the WIFI available channel list on the user interface.

From the above two scenarios, in the technical solution proposed by the present invention, the WIFI 5 GHz channel is turned off when LTE-U is activated, and the WIFI 5 GHz channel is turned on when LTE-U is deactivated. Thus, at the software level, the 5 GHz channel usage time is staggered on the mobile terminal, which better avoids the self-interference problem. Therefore, a user of the terminal can enjoy a high rate brought by the LTE-U network, and the WIFI hotspot and P2P of the user are ensured to be available externally.

Figure 11:
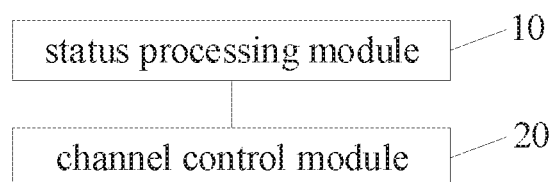
FIG. 11 is a structural block diagram of a LTE-U and WIFI 5G channel self-interference addressing system of a mobile terminal according to the present invention.

Based on the aforesaid LTE-U and WIFI 5G channel self-interference addressing method of the mobile terminal, the present invention further provides a LTE-U and WIFI 5G channel self-interference addressing system of a mobile terminal. Please refer to FIG. 11. The LTE-U and WIFI 5G channel self-interference addressing system of a mobile terminal, including:

a status processing module 10, configured for receiving an status change message of a LTE-U by a radio resource control layer of an LTE protocol stack, and reporting the same to a mobile terminal application layer by a registration module of an non-access layer, which is specifically described in Step S100;

a channel control module 20, configured for configuring corresponding system parameters according to the status change message of the LTE-U, and configuring a WIFI available channel list by using the system parameters to control on and off of 5 GHz channel, which is specifically described in Step S200.

Furthermore, the status change message includes: a cell status, a cell identification number, a cell frequency point and a cell data bandwidth of the LTE-U as a secondary cell; wherein the cell status includes an activated state and a deactivated state;

the system parameters include: a first system parameter for initiating a WIFI hotspot channel check and a second system parameter for initiating a WIFI P2P channel check.

Furthermore, the status processing module 10 includes:

a first secondary cell setting unit, configured for carrying LTE-U configuration information by an added list of the secondary cell in a RRC connection reconfiguration process of an air interface message, and using the LTE-U as the secondary cell after being confirmed by the mobile terminal when the mobile terminal enters a LTE-U activation state;

a message transmitting unit, configured for transmitting the status change message of the secondary cell to a mobile terminal application layer with a mobile terminal modem by using a BP communication mechanism and an AP communication mechanism of the mobile terminal.

Furthermore, the channel control module 20 includes:

a first channel setting unit, configured for receiving the status change message by the mobile terminal application layer to set a parameter value of the first system parameter and a parameter value of the second system parameter to true, and starting a WIFI channel usage check process to set a WIFI available channel list to 2.4 GHz and to control the 5 GHz channel to be off.

Furthermore, the status processing module 10 includes:

a second secondary unit setting unit, configured for notifying the mobile terminal modem by the RRC connection reconfiguration process of the air interface message, and deactivating a current LTE-U as the secondary cell when the mobile terminal enters a LTE-U deactivation state;

a second message transmitting unit, configured for transmitting the status change message of the secondary cell to a mobile terminal application layer with a mobile terminal modem by using a BP communication mechanism and an AP communication mechanism of the mobile terminal.

Furthermore, the channel control module 20 includes:

a second channel setting unit, configured for receiving the status change message by the mobile terminal application layer to set a parameter value of the first system parameter and a parameter value of the second system parameter to false, and setting a WIFI available channel list to 2.4 GHz and 5 GHz to control the 5 GHz channel to be turned on.

Since the specific principles and detailed technical features of the LTE-U and WIFI 5G channel coexistence self-interference addressing system of the mobile terminal have been described in detail in the foregoing embodiments of the LTE-U and WIFI 5G channel coexistence self-interference addressing method of the mobile terminal, no further details are provided herein.

The division of the foregoing functional modules is only for exemplification. In practical applications, the foregoing function assignments may be performed by different functional modules as needed, that is, divided into different functional modules to complete all or part of the functions described above.

Furthermore, based on the aforesaid LTE-U and WIFI 5G channel coexistence self-interference addressing method of the mobile terminal, the present invention further provides a LTE-U and WIFI 5G channel coexistence self-interference addressing system of a mobile terminal. The system includes a memory and a processor, wherein the memory is configured to store operation instructions and an operation system executed by the processor; the processor is configured to perform the LTE-U and WIFI 5G channel coexistence self-interference addressing method of the mobile terminal provided by the foregoing embodiment according to the operation instructions stored in the memory. Furthermore, the operations executed by the processor in the LTE-U and WIFI 5G channel coexistence self-interference addressing system of the mobile terminal according to the present invention correspond to functions of implementing the various modules and/or units shown in FIG. 11.

A person of ordinary skill in the art may understand that all or part of the processes in the aforesaid embodiments may be accomplished by a computer (or mobile terminal) program to instruct related hardware, and the computer (or mobile terminal) program may be stored in a computer (or mobile terminal) readable storage medium, and the program is executed. The flowchart of the embodiment of each of the above methods may be included. The aforesaid storage medium may be a magnetic disk, an optical disk, a read only memory (ROM) or a random access memory (RAM).

In conclusion, the present invention provides a LTE-U and WIFI 5G channel coexistence self-interference addressing method and system. An status change message of the LTE-U is received by a radio resource control layer of an LTE protocol stack, and reported to a mobile terminal application layer by a registration module of an non-access layer; and corresponding system parameters are configured according to the status change message of the LTE-U, and a WIFI available channel list is configured by using the system parameters to control the on and off of the 5 GHz channel. It solves the problem that the LTE-U receiving antenna will receive large co-channel interference when the WIFI signal transmitter works at 5 GHz. Therefore, a user can enjoy a high rate brought by the LTE-U network, and the WIFI hotspot and P2P of the user are ensured to be available externally, thus creating great convenience.

It will be appreciated that those of ordinary skill in the art, or can be changed according to the technical equivalents of the invention and its inventive concept, and all such modifications or substitutions of the present invention should belong to the appended claims protected range.

What is claimed is:

1. A non-transitory storage medium, in which program data is stored in the storage medium, wherein the program data is executable to perform following operations:

receiving a status change message of a Long Term Evolution-unlicensed (LTE-U) by a radio resource control layer of an LTE protocol stack, and reporting the same to a mobile terminal application layer by a registration module of an non-access layer;

configuring corresponding system parameters according to the status change message of the LTE-U, and configuring a WIFI available channel list by using the system parameters to control on and off of 5 GHz channel;

wherein system parameters are global variables;

wherein the status change message includes: a cell status, a cell identification number, a cell frequency point and a cell data bandwidth of the LTE-U as a secondary cell; wherein the cell status includes an activated state and a deactivated state;

the system parameters include: a first system parameter for initiating a Wireless Fidelity (WIFI) hotspot channel check and a second system parameter for initiating a WIFI peer-to-peer (P2P) channel check.

2. The non-transitory storage medium according to claim 1, wherein the program data is further executed to achieve following operations:
carrying LTE-U configuration information by an added list of the secondary cell in a Radio Resource Control (RRC) connection reconfiguration process of an air interface message, and using the LTE-U as the secondary cell after being confirmed by the mobile terminal when the mobile terminal enters a LTE-U activation state;
transmitting the status change message of the secondary cell to a mobile terminal application layer with a mobile terminal modem by using a Base point (BP) communication mechanism and an Access Point (AP) communication mechanism of the mobile terminal.

3. The non-transitory storage medium according to claim 2, wherein the program data is further executed to achieve following operations:
receiving the status change message by the mobile terminal application layer to set a parameter value of the first system parameter and a parameter value of the second system parameter to true, and starting a WIFI channel usage check process to set a WIFI available channel list to 2.4 GHz and to control the 5 GHz channel to be off.

4. The non-transitory storage medium according to claim 1, wherein the program data is further executed to achieve following operations:
notifying the mobile terminal modem by the RRC connection reconfiguration process of the air interface message, and deactivating a current LTE-U as the secondary cell when the mobile terminal enters a LTE-U deactivation state;
transmitting the status change message of the secondary cell to a mobile terminal application layer with a mobile terminal modem by using a BP communication mechanism and an AP communication mechanism of the mobile terminal.

5. The non-transitory storage medium according to claim 4, wherein the program data is further executed to achieve following operations:
receiving the status change message by the mobile terminal application layer to set a parameter value of the first system parameter and a parameter value of the second system parameter to false, and setting a WIFI available channel list to 2.4 GHz and 5 GHz to control the 5 GHz channel to be on.

6. A LTE-U and WIFI 5G channel self-interference addressing system of a mobile terminal, including a memory and a processor, wherein the memory and the processor are coupled to each other:
the memory is configured to store operation instructions and an operation system executed by the processor;
the processor is configured to perform following operations according to the operation instructions: receiving an status change message of a Long Term Evolution-unlicensed (LTE-U) by a radio resource control layer of an LTE protocol stack, and reporting the same to a mobile terminal application layer by a registration module of an non-access layer;
configuring corresponding system parameters according to the status change message of the LTE-U, and configuring a Wireless Fidelity (WIFI) available channel list by using the system parameters to control on and off of 5 GHz channel;
wherein the status change message includes: a cell status, a cell identification number, a cell frequency point and a cell data bandwidth of the LTE-U as a secondary cell; wherein the cell status includes an activated state and a deactivated state;
the system parameters include: a first system parameter for initiating a WIFI hotspot channel check and a second system parameter for initiating a WIFI peer-to-peer (P2P) channel check.

7. The LTE-U and WWI 5G channel self-interference addressing system of the mobile terminal according to claim 6, wherein the processor is further configured to perform following operations according to the operation instructions:
carrying LTE-U configuration information by an added list of the secondary cell in a Radio Resource Control (RRC) connection reconfiguration process of an air interface message, and using the LTE-U as the secondary cell after being confirmed by the mobile terminal when the mobile terminal enters a LTE-U activation state;
transmitting the status change message of the secondary cell to a mobile terminal application layer with a mobile terminal modem by using a Base point (BP) communication mechanism and an Access Point (AP) communication mechanism of the mobile terminal.

8. The LTE-U and WIFI 5G channel self-interference addressing system of the mobile terminal according to claim 7, wherein the processor is further configured to perform following operations according to the operation instructions:
receiving the status change message by the mobile terminal application layer to set a parameter value of the first system parameter and a parameter value of the second system parameter to true, and starting a WIFI channel usage check process to set a WIFI available channel list to 2.4 GHz and to control the 5 GHz channel to be off.

9. The LTE-U and WIFI 5G channel self-interference addressing system of the mobile terminal according to claim 6, wherein the processor is further configured to perform following operations according to the operation instructions:
notifying the mobile terminal modem by the RRC connection reconfiguration process of the air interface message, and deactivating a current LTE-U as the secondary cell when the mobile terminal enters a LTE-U deactivation state;
transmitting the status change message of the secondary cell to a mobile terminal application layer with a mobile terminal modem by using a BP communication mechanism and an AP communication mechanism of the mobile terminal.

10. The LTE-U and WIFI 5G channel self-interference addressing system of the mobile terminal according to claim 9, wherein the processor is further configured to perform following operations according to the operation instructions:
receiving the status change message by the mobile terminal application layer to set a parameter value of the first system parameter and a parameter value of the second system parameter to false, and setting a WIFI available channel list to 2.4 GHz and 5 GHz to control the 5 GHz channel to be on.

11. A Long Term Evolution-unlicensed (LTE-U) and Wireless Fidelity (WIFI) 5G channel self-interference addressing method of a mobile terminal, including:

A, receiving a status change message of a LTE-U by a radio resource control layer of an LTE protocol stack, and reporting the same to a mobile terminal application layer by a registration module of an non-access layer;

B, configuring corresponding system parameters according to the status change message of the LTE-U, and configuring a WIFI available channel list by using the system parameters to control on and off of 5 GHz channel;

wherein the status change message includes: a cell status, a cell identification number, a cell frequency point and a cell data bandwidth of the LTE-U as a secondary cell; wherein the cell status includes an activated state and a deactivated state;

the system parameters include: a first system parameter for initiating a WIFI hotspot channel check and a second system parameter for initiating a WIFI peer-to-peer (P2P) channel check.

12. The LTE-U and WIFI 5G channel self-interference addressing method of the mobile terminal according to claim 11, wherein Step A includes:

A11, carrying LTE-U configuration information by an added list of the secondary cell in a Radio Resource Control (RRC) connection reconfiguration process of an air interface message, and using the LTE-U as the secondary cell after being confirmed by the mobile terminal when the mobile terminal enters a LTE-U activation state;

A12, transmitting the status change message of the secondary cell to a mobile terminal application layer with a mobile terminal modem by using a Base point (BP) communication mechanism and an Access Point (AP) communication mechanism of the mobile terminal.

13. The LTE-U and WIFI 5G channel self-interference addressing method of the mobile terminal according to claim 12, wherein Step B includes:

B11, receiving the status change message by the mobile terminal application layer to set a parameter value of the first system parameter and a parameter value of the second system parameter to true, and starting a WIFI channel usage check process to set a WIFI available channel list to 2.4 GHz and to control the 5 GHz channel to be off.

14. The LTE-U and WIFI 5G channel self-interference addressing method of the mobile terminal according to claim 11, wherein Step A includes:

A21, notifying the mobile terminal modem by the RRC connection reconfiguration process of the air interface message, and deactivating a current LTE-U as the secondary cell when the mobile terminal enters a LTE-U deactivation state;

A22, transmitting the status change message of the secondary cell to a mobile terminal application layer with a mobile terminal modem by using a BP communication mechanism and an AP communication mechanism of the mobile terminal.

15. The LTE-U and WIFI 5G channel self-interference addressing method of the mobile terminal according to claim 14, wherein Step B includes:

B21, receiving the status change message by the mobile terminal application layer to set a parameter value of the first system parameter and a parameter value of the second system parameter to false, and setting a WIFI available channel list to 2.4 GHz and 5 GHz to control the 5 GHz channel to be on.

* * * * *